United States Patent [19]
Bush

[11] 3,862,518
[45] Jan. 28, 1975

[54] TRIMMER DEVICE FOR ROTARY ENGINE SIDE SEALS

[75] Inventor: Jerome J. Bush, Holland, Mich.

[73] Assignee: Sealed Power Corporation, Muskegon, Mich.

[22] Filed: Jan. 10, 1974

[21] Appl. No.: 432,412

[52] U.S. Cl................ 51/99, 51/216 R, 83/468, 83/491
[51] Int. Cl........ B24b 7/00, B24b 9/00, B24b 41/06
[58] Field of Search......... 51/47, 68, 69, 216 R, 98, 51/126, 99, 238 R, 240 R; 83/471.2, 467, 468, 491

[56] References Cited
UNITED STATES PATENTS

| | | | |
|---|---|---|---|
| 2,367,297 | 1/1945 | McCain | 51/98 R |
| 3,073,073 | 1/1963 | Van Pelt | 51/98 R |
| 3,421,265 | 1/1969 | Parachek | 51/99 |
| 3,523,392 | 8/1970 | Carl | 51/99 |
| 3,656,261 | 4/1972 | Everett | 51/99 |

*Primary Examiner*—Othell M. Simpson
*Attorney, Agent, or Firm*—Barnes, Kisselle, Raisch & Choate

[57] ABSTRACT

A trimmer device for rotary engine replacement side seals having a grinder assembly pivotally mounted on a worktable for trimming material from one end of a replacement side seal received in a retaining groove in the worktable. Adjustable stops on the grinder assembly and the worktable may be utilized to set up the trimmer device for trimming a replacement side seal to a desired overall length.

13 Claims, 8 Drawing Figures

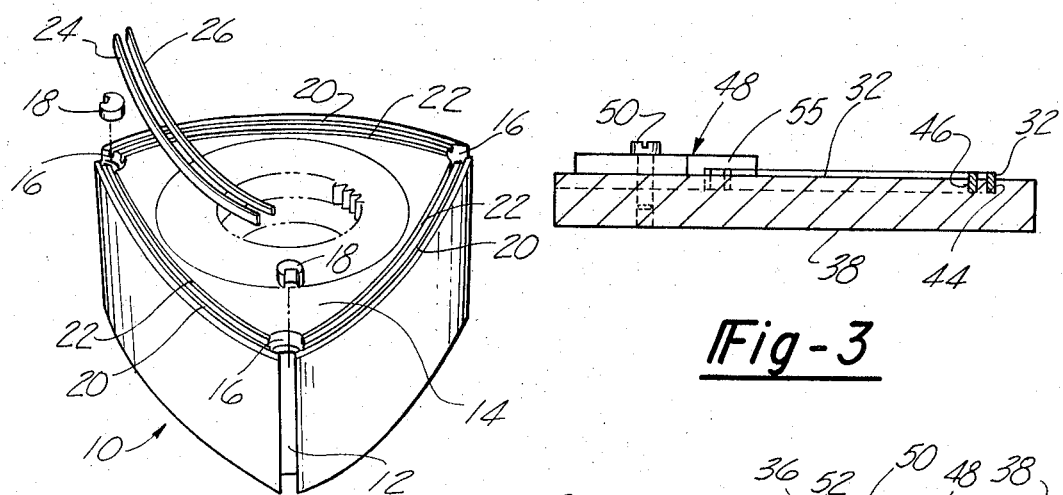
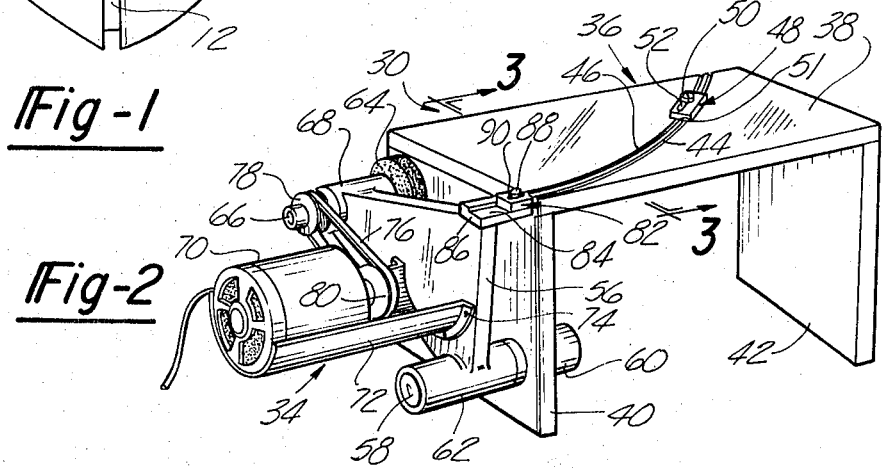
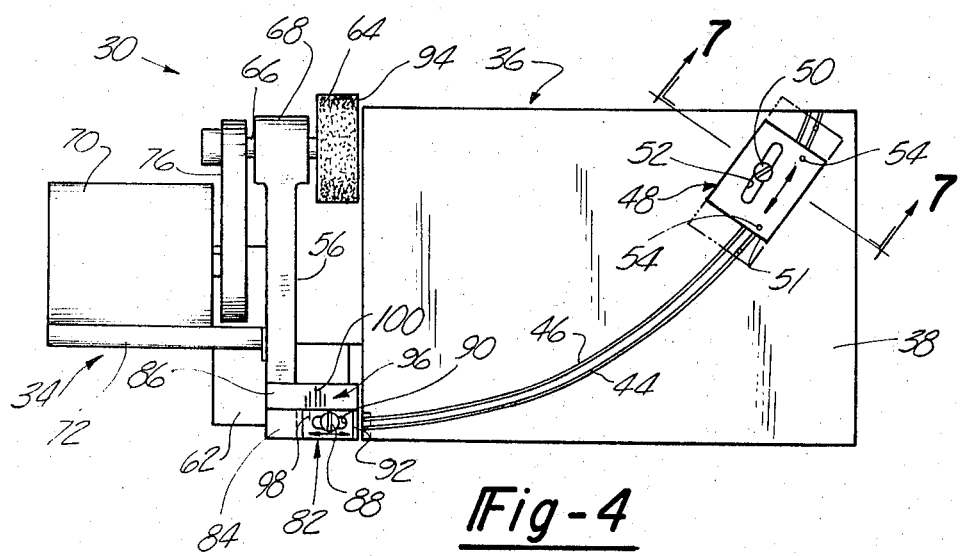

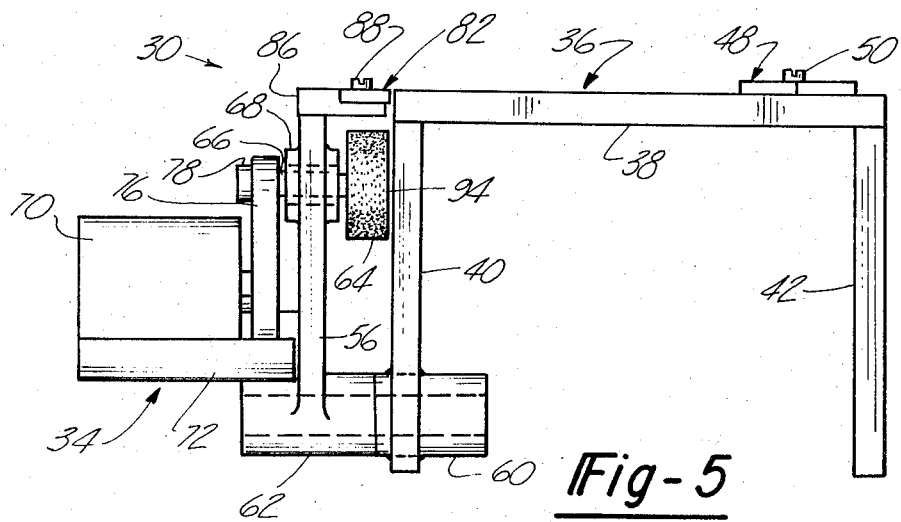
Fig-5
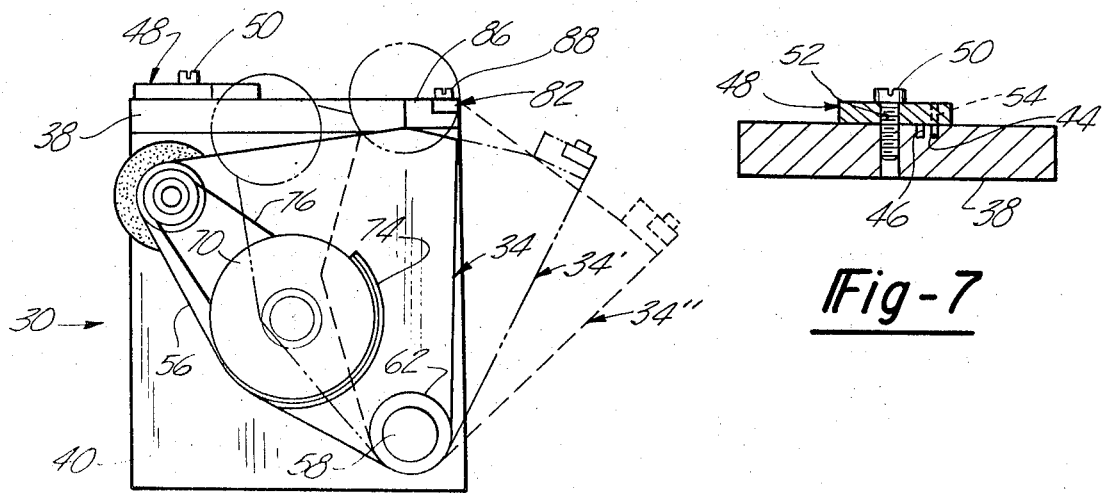
Fig-6
Fig-7
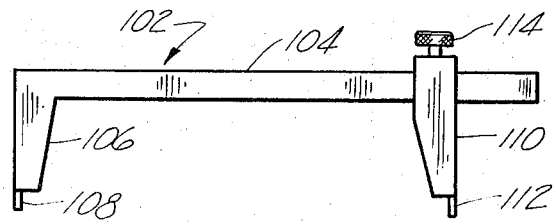
Fig-8

TRIMMER DEVICE FOR ROTARY ENGINE SIDE SEALS

This invention relates to side seals for rotary engines and more particularly to a device for trimming replacement side seals for rotary engines.

In a typical rotary engine elongate side seals are received in pairs of grooves in the side faces of a generally triangular rotor and extend between button seals in the side faces adjacent each corner of the rotor. In mass production of rotary engines, it is not commercially practical to locate the pockets for the corner seals in the rotors with sufficient accuracy so that side seals of uniform overall length may be utilized with the rotors. Thus, during original manufacture and assembly of rotary engines, side seals of various lengths are produced and a side seal of appropriate length is matched with each side seal groove of each rotor to provide the proper clearance between each side seal and the button seals.

In use, the side seals of rotary engines eventually become sufficiently worn to require replacement. In the field it is impractical to provide service garages with a wide range of replacement seals of varying lengths, and hence, replacement seals for rotary engines are customarily produced with a uniform length which exceeds the longest side seal required for the rotary engines. In installing such replacement seals in the field a mechanic customarily individually fits each side seal to an individual groove of a particular rotor by removing material from one end of each seal with a hand file to provide a seal having the appropriate length for the individual groove. Since there are twelve side seal grooves per rotor and two rotors in a typical rotary engine, this is a tedious, time-consuming and expensive process. Moreover, attainment of the proper clearance between the replacement side seals and their associated button seals is dependent on the skill and experience of the particular mechanic installing such replacement seals, and hence, the service life of the replacement seals may vary substantially depending on the quality of the installation thereof.

Objects of this invention are to provide a device for trimming replacement side seals for a rotary engine which rapidly and accurately trims each replacement side seal to the proper length to be received in an individual groove of a rotor between a pair of associated button seals, can be adjusted to trim a pair of associated side seals at the same time based on a single measurement of only one of the pair of associated grooves in the rotor in which a pair of side seals will be received, is rapidly and easily set up to trim replacement side seals to the proper overall length, substantially decreases the skill and experience required by a mechanic to properly fit replacement side seals in a rotor, is durable and of economical manufacture and assembly, and requires little maintenance and service.

These and other objects, features and advantages of this invention will be apparent from the following description, appended claims and accompanying drawing in which:

FIG. 1 is an isometric view of a rotor of a rotary engine and an associated pair of side seals and button seals.

FIG. 2 is an isometric view of a trimmer device embodying this invention for replacement side seals for a rotary engine.

FIG. 3 is a fragmentary sectional view on line 3—3 of FIG. 2 illustrating a pair of side seals releasably retained in the trimmer device.

FIGS. 4, 5 and 6 are plan, side and end views respectively of the trimmer device of FIG. 2.

FIG. 7 is a sectional view on line 7—7 of FIG. 4 illustrating an adjustable stop.

FIG. 8 is a side view of an adjustable caliper which may be used with a trimmer device.

Referring in more detail to the drawings, FIG. 1 illustrates a generally triangular rotor 10 for a rotary engine (not shown) with three axially extending slots 12 adjacent the edges thereof for retaining apex seals (not shown) and a pair of opposed side faces 14 only one of which is shown. Pockets 16 in each corner of side face 14 are adapted to receive button seals 18 therein and pairs of arcuate or curved grooves 20 and 22 extend between pockets 16 to receive and retain pairs of side seals 24 and 26 between button seals 18. The construction and operation of a rotary engine is shown and described in U.S. Pat. No. 3,323,713 issued June 6, 1967 which is incorporated herein by reference and is well known to those skilled in the art, and hence, need not be further described herein.

FIGS. 2 through 7 illustrate a trimmer device 30 embodying this invention for shortening replacement side seals 32 (FIG. 3) by removing material from an end thereof to provide side seals with the proper overall length to be received in a groove of a rotor between the button seals thereof such as side seals 24 and 26 of rotor 10. Trimmer device 30 has a grinder assembly 34 mounted on a base or worktable 36 with a top plate 38 and side plates 40 and 42 fixed thereto and depending therefrom to provide legs. Top plate 38 has a pair of curved retainer grooves 44 and 46 in the upper face thereof for slidably receiving and retaining replacement seals 32 therein. Preferably, the curvature of retainer grooves 44 and 46 is substantially the same as grooves 20 and 22 in rotor 10 so that replacement seals 32 will be retained in trimmer device 30 with substantially the same curvature as when received in rotor 10.

An adjustable stop 48 overlies retainer grooves 44 and 46 and is secured to top plate 38 by a setscrew 50 extending through an elongate slot 52 in adjustable stop 48. Movement of adjustable stop 40 on top plate 38 is guided by a pair of pins 54 fixed to the adjustable stop and projecting into groove 44 as shown in FIG. 7. As shown in FIG. 3, adjustable stop 48 has an end face 55 adapted to bear on one end of replacement seals 32 received in retainer grooves 44 and 46.

Grinder assembly 34 has a carrier plate 56 pivotally mounted on worktable 36 by a pin 58. One end of pin 58 is secured in a bushing 60 fixed in side plate 40 of worktable 36 and the other end of the pin is slidably received in a tubular sleeve 62 fixed to carrier plate 56. A grinding wheel 64 is mounted on an arbor 66 journaled for rotation in a housing 68 fixed to carrier plate 56. Grinding wheel 64 is driven by an electric motor 70 mounted on carrier plate 56 by a bracket 72 secured thereto by screws 74. Motor 70 is drivingly connected to arbor 66 by a belt 76 and pulleys 78 and 80 secured to the arbor and the drive shaft of the motor respectively. An adjustable stop 82 is received on a way 84 of a guide block 86 fixed to carrier plate 56. Adjustable stop 82 slides on way 84 and is releasably secured to guide block 86 by a setscrew 88 extending through an elongate slot 90 in adjustable stop 82. To facilitate adjusting the position of end face 92 of adjustable stop 82 in relation to the side face 94 of grinding wheel 64, a graduated scale 96 is provided on guide block 86 which co-operates with an indicia mark 98 on adjustable stop 82. Preferably, indicia mark 98 is positioned on stop 82 so that it is aligned with the central indicia mark 100 of graduated scale 96 when the end face 92 of the adjustable stop lies in the plane of the side face 94 of grinding wheel 64.

A caliper 102, as shown in FIG. 8, may be used in setting up trimmer device 30 to trim replacement side seals 32 to the proper length. Caliper 102 has a beam 104 having a fixed arm 106 thereon with a finger 108 depending therefrom. A movable arm 110 with a depending finger 112 is slidably received on beam 104 and retained thereon by a setscrew 114.

In using trimmer device 30, stop 82 may be set to provide the desired clearance between the replacement side seals and the button seals associated therewith. To provide the desired clearance, stop 82 may be moved so that the end face 92 thereof is displaced from the plane of side face 94 of grinding wheel 64 a distance equal to the desired clearance; i.e., to the left as viewed in FIG. 4. The distance the end face 92 of the stop is displaced may be readily determined by using graduated scale 96, wherein each indicia mark on either side of the central indicia mark 100 represents the displacement of the stop from the plane of side face 94 of grinding wheel 64 in accordance with any convenient scale, such as 0.020 of an inch for each indicia mark. The button seals 18 are inserted in the pockets 16 of rotor 10 and the chordal distance of one of the grooves, such as groove 20, between a pair of the button seals is measured by caliper 102. To measure this distance, the fingers 108 and 112 of caliper 102 are inserted into groove 20, arm 110 is shifted on beam 104 so that the fingers firmly bear on the button seals, and arm 110 is locked in this position by setscrew 114. Caliper 102 is then removed from groove 20 of rotor 10 and inserted into the corresponding groove 44 of trimmer device 30 with one of its fingers 108 or 112 bearing on end face 92 of adjustable stop 82. Adjustable stop 48 is thereafter moved so that its end face 55 bears on the other finger 108 or 112 and is secured in this position by setscrew 50 with each of the stops simultaneously bearing on one of the fingers.

Caliper 102 is removed from groove 44 and grinder assembly 34 pivoted to the intermediate position shown at 34' in FIG. 6. A pair of replacement side seals 32 are inserted in grooves 44 and 46 with one end of each side seal abutting on end face 55 of adjustable stop 48 and the other end of each side seal extending beyond the edge of the grooves adjacent the grinder assembly into the path of grinding wheel 64. Motor 70 is energized to drive grinding wheel 64 and grinding assembly 34 is further pivoted to the position 34'' (FIG. 6), thereby grinding material off one end of each replacement seal to provide a pair of seals such as seals 24 and 26 of the appropriate length to be received between button seals 18 of rotor 10. As grinding wheel 64 is pivotally swung across each replacement seal 32, the cylindrical face of the grinding wheel removes the bulk of the material from the end of the side seal and the side face 94 of the grinding wheel completes the grinding of the end face of the seal, thereby providing a good surface finish thereon and producing the desired overall length of the side seal within very close tolerances. Since the side face 94 of grinding wheel 64 only removes a little material from each side seal, grinding wheel 64 can be used to accurately grind several hundred pairs of side seals before the side face 94 must be dressed. When side face 94 of the grinding wheel has been dressed, it may be necessary to re-adjust stop 82. After the replacement seals have been trimmed to the proper length, they may be removed from trimmer device 30 for insertion in rotor 10 and grinding assembly 34 pivotally swung back to its starting position as shown in solid line in FIG. 6. To trim another pair of replacement seals for rotor 10, caliper 102 is inserted in one of the grooves of another pair of side seal grooves in the rotor and the procedure repeated.

If desired, trimmer device 30 can be used to trim one replacement side seal at a time, although it is preferred to trim the side seals in pairs to decrease the number of measurements made with the caliper and the time required by operating personnel to fit replacement side seals in a rotor. If the side seals being replaced are not so badly worn on the ends thereof that there is not excessive clearance between such side seals and their associated button seals, such side seals may be used as a gauge or spacer for setting up trimmer device 30, thereby eliminating the need to use caliper 102. If the seals to be replaced are used as a gauge or spacer, adjustable stop 82 is set so that the end face 92 thereof lies in the plane of side face 94 of grinding wheel 64 since such side seals, when used as gauges or spacers, already provide the desired clearance. One of the side seals of each such pair is inserted in the corresponding retainer groove 44 or 46 in trimmer device 30 with one end bearing on end face 92 of stop 82. Adjustable stop 48 is positioned so that end face 55 thereof bears on the other end of the side seal and is secured in this position with both stops bearing on opposed ends of the side seal. The side seal is removed from the groove and a pair of replacement side seals 32 inserted in grooves 44 and 46 of trimmer device 30. These replacement side seals are then trimmed to the proper length by pivotal movement of grinder assembly 34 in the same manner as the replacement seals are trimmed when caliper 102 is used to position stop 48.

The trimmer device of this invention facilitates rapid and economical replacement in the field of rotary engine side seals and provides improved quality of fit and installation of replacement side seals than prior techniques for field replacement of side seals. This trimmer device enables field personnel with less skill and experience to correctly and satisfactorily install replacement side seals in a rotary engine and is believed to increase the average useful life of replacement side seals installed in the field. The trimmer device of this invention may be easily set up and rapidly trims replacement side seals to the desired overall length, particularly when the replacement side seals are trimmed in associated pairs, thereby decreasing the cost of installing replacement side seals. The trimmer device is of simple design with relatively few component parts and, thus, may be economically manufactured and assembled and requires little maintenance and service.

I claim:

1. A rotary engine side seal trimmer device comprising a base, retainer means carried by said base for releasably retaining at least one elongate side seal for a rotary engine in the generally curved state it assumes when assembled in a rotary engine, material removal means carried by said base for movement relative to said retainer means in a plane generally transverse to one end of an elongate side seal received in said retainer means to remove material from one end of the elongate side seal such that the overall length of the elongate side seal is decreased, a first stop associated with said retainer means and movable toward and away from the plane of said material removal means to bear on the other end of the side seal received in said retainer means such that the amount of material removed from said one end of the elongate side seal can be varied by adjustment of the position of said first stop in relation to said plane of said material removal means, and a second stop movable relative to said retainer means for a first position adjacent an end of said retainer means distal from said first stop and in a predetermined relationship to said plane of movement of said material removal means such that a spacer means may be interposed between said stops and said first stop positioned so that both of said stops simultaneously bear on said spacer means to a second position spaced from said first position when said material removal means engages said one end of the side seal to remove material therefrom, whereby the trimmer device will produce an elongate side seal of a predetermined overall length by removing material from said one end of the elongate side seal.

2. The trimmer device of claim 1 wherein said retainer means is adapted to releasably retain at least two elongate side seals in the generally curved state they assume when assembled in a rotary engine such that the material removal means can remove material from one end of each of the side seals received in said retainer means, and said first stop simultaneously bears on the other end of each of the side seals received in said retainer means such that the amount of material removed from said one end of all of the elongate side seals simultaneously received in said retainer means can be simultaneously varied by adjustment of said first stop.

3. The trimmer device of claim 1 wherein said material removal means comprises a rotary tool on a carrier pivotally mounted on said base for pivotal movement of said rotary tool in a generally arcuate path in a plane generally transverse to one end of an elongate side seal received in said retainer means.

4. The trimmer device of claim 3 wherein said second stop is mounted on said carrier.

5. The trimmer device of claim 4 which also comprises means adjustably mounting said second stop on said carrier for being secured in a range of positions on an axis extending generally transverse to said plane of said material removal means.

6. The trimmer device of claim 3 wherein said rotary tool turns on an axis generally transverse to said plane of said material removal means.

7. The trimmer device of claim 3 wherein said rotary tool comprises a grinding wheel which rotates on an axis generally transverse to said plane of said material removal means and has a generally radially extending substantially flat side face generally parallel with said plane of said material removal means.

8. The trimmer device of claim 1 wherein said retainer means comprises a generally curved groove adapted to receive an elongate side seal extending generally longitudinally therein.

9. The trimmer device of claim 2 wherein said retainer means comprises at least two generally curved grooves generally radially spaced from each other and each adapted to receive an elongate side seal extending generally longitudinally therein.

10. A rotary engine side seal trimmer device comprising a base, retainer means carried by said base for releasably retaining at least two elongate side seals for a rotary engine in spaced apart side by side relationship each in the generally curved state it assumes when assembled in a rotary engine, a rotary tool carried by said base for movement relative to said retainer means generally transverse to one end of elongate side seals received in said retainer means to remove material from the one end of the elongate side seals such that the overall length of each of the elongate side seals is decreased, and a first stop associated with said retainer means to simultaneously bear on the other end of each of the side seals received in said retainer means to determine the overall length of each of the side seals in the retainer means from which material is removed from said one end thereof by said rotary tool.

11. The trimmer device of claim 10 which also comprises means for releasably securing said first stop in a range of spaced positions from the transverse path of travel of said cutting tool relative to said one end of the side seals such that the position of said first stop can be adjusted to simultaneously vary the overall length of all of the side seals received in the retainer means from which material is removed by the rotary tool during operation of the trimmer device.

12. The trimmer device of claim 10 which also comprises a carrier having said rotary tool mounted thereon, said carrier being pivotally carried by said base for pivotal movement of said rotary tool in a generally arcuate path in a plane generally transverse to said one end of said side seals.

13. The trimmer device of claim 12 which also comprises a second stop carried by said carrier, for pivotal movement to a first position adjacent said one end of said side seals when received in said retainer means and a second position spaced from said first position when said rotary tool engages said one end of said side seals.

* * * * *

UNITED STATES PATENT OFFICE
CERTIFICATE OF CORRECTION

PATENT NO. : 3,862,518
DATED : January 28, 1975
INVENTOR(S) : Jerome J. Bush

It is certified that error appears in the above-identified patent and that said Letters Patent are hereby corrected as shown below:

Column 2, line 9, delete "a" and insert "the".

Column 2, line 46, delete "40" and insert "48".

Column 5, line 15, delete "for" and insert "from".

Column 5, line 21, after "means" insert "and".

Signed and sealed this 20th day of May 1975.

(SEAL)
Attest:

RUTH C. MASON
Attesting Officer

C. MARSHALL DANN
Commissioner of Patents
and Trademarks